United States Patent [19]

Soule

[11] Patent Number: 5,470,467

[45] Date of Patent: * Nov. 28, 1995

[54] OIL SPILL CONTAINMENT AND RECOVERY SYSTEM

[76] Inventor: Wyman T. Soule, 12 Maynes Ave., Albany, N.Y. 12203

[*] Notice: The portion of the term of this patent subsequent to Jul. 12, 2011, has been disclaimed.

[21] Appl. No.: 228,292

[22] Filed: Apr. 15, 1994

Related U.S. Application Data

[63] Continuation of Ser. No. 919,778, Jul. 23, 1992, Pat. No. 5,328,607.

[51] Int. Cl.⁶ .................................................... F02B 15/04
[52] U.S. Cl. ........................ 210/242.3; 210/923; 405/68
[58] Field of Search ............................... 210/242.3, 776, 210/923, 257.1, 258, 259, 242.1, 360.1; 114/74 R, 74 T, 256, 345, 354; 405/63, 66, 68; 494/85, 901

[56] References Cited

U.S. PATENT DOCUMENTS

| | | | |
|---|---|---|---|
| 3,067,712 | 12/1962 | Doerpinghaus | 114/74 T |
| 3,221,884 | 12/1965 | Muller | 210/923 |
| 3,369,664 | 2/1968 | Dahan | 210/923 |
| 3,508,652 | 4/1970 | Woolley | 210/923 |
| 3,532,219 | 10/1970 | Valdespino | 210/242.3 |
| 3,613,377 | 10/1971 | Zaugg | 405/68 |
| 3,666,098 | 5/1972 | Garland et al. | 210/923 |
| 3,703,811 | 11/1972 | Smith | 405/68 |
| 3,708,982 | 1/1973 | Blockwick | 210/242.4 |
| 3,724,662 | 4/1973 | Ortiz | 210/242.3 |
| 3,730,346 | 5/1973 | Prewitt | 210/242.3 |
| 3,731,491 | 5/1973 | Markel et al. | 405/56 |
| 3,839,977 | 10/1974 | Bradberry | 114/74 T |
| 4,096,700 | 6/1978 | Muramatsu et al. | 405/63 |
| 4,111,809 | 9/1978 | Pichon | 210/242.3 |
| 4,207,191 | 6/1980 | Webb | 210/242.3 |
| 4,227,478 | 10/1980 | Preus | 114/256 |
| 4,610,788 | 9/1986 | Ward | 210/242.3 |
| 4,752,393 | 6/1988 | Meyers | 210/242.3 |
| 4,762,078 | 8/1988 | Palmer, Jr. | 114/39.1 |
| 4,790,936 | 12/1988 | Renfrow | 210/242.3 |
| 4,964,758 | 10/1990 | Pekelny | 405/66 |
| 5,040,918 | 8/1991 | Taricco | 405/66 |
| 5,056,958 | 10/1991 | Campbell | 405/68 |
| 5,064,310 | 11/1991 | Sullivan | 405/69 |
| 5,073,261 | 12/1991 | Conradi et al. | 210/242.1 |
| 5,160,432 | 11/1992 | Gattuso | 210/242.3 |
| 5,328,607 | 7/1994 | Soule | 210/242.3 |

*Primary Examiner*—Christopher Upton
*Attorney, Agent, or Firm*—Stetina Brunda & Buyan

[57] ABSTRACT

The present invention relates to an oil containment and recovery system for confining and collecting oil spills wherein the oil spill is surrounded and contained within a floating barrier and the oil is pumped from within the enclosure defined by the floating barrier into floating reservoirs proximate the barrier. The floating barrier utilizes an elongate inflatable buoyant member and an elongate suction conduit depending downwardly from the buoyant member and having a plurality of apertures formed therein through which oil flows into the suction member. The inflatable member is inflated with air to obtain the desired buoyancy. The weight means depends downwardly from the suction conduit to maintain the buoyant member and suction conduit in a desired orientation to facilitate containment and collection of the oil spill. The buoyant member is collapsible into a substantially flat configuration such that the floating barrier and conduit can be wrapped about a reel in a compact manner which facilitates storage and transportation thereof. A pump in fluid communication with the suction conduit effects oil flow from the suction conduit to a centrifuge which separates water from the collected oil. The oil is then pumped to a floating reservoir proximate the floating barrier.

6 Claims, 3 Drawing Sheets

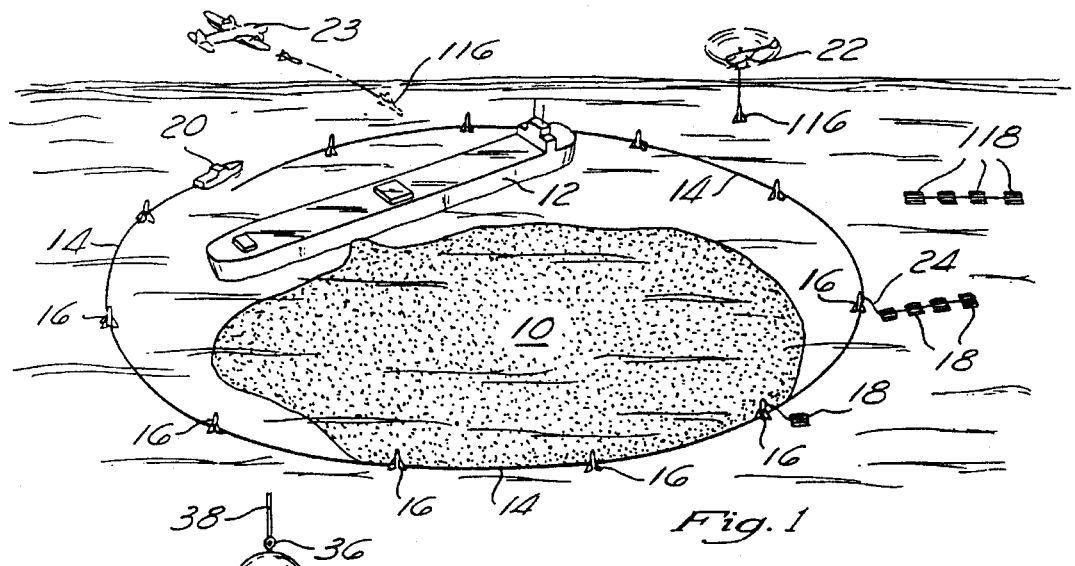
Fig. 1
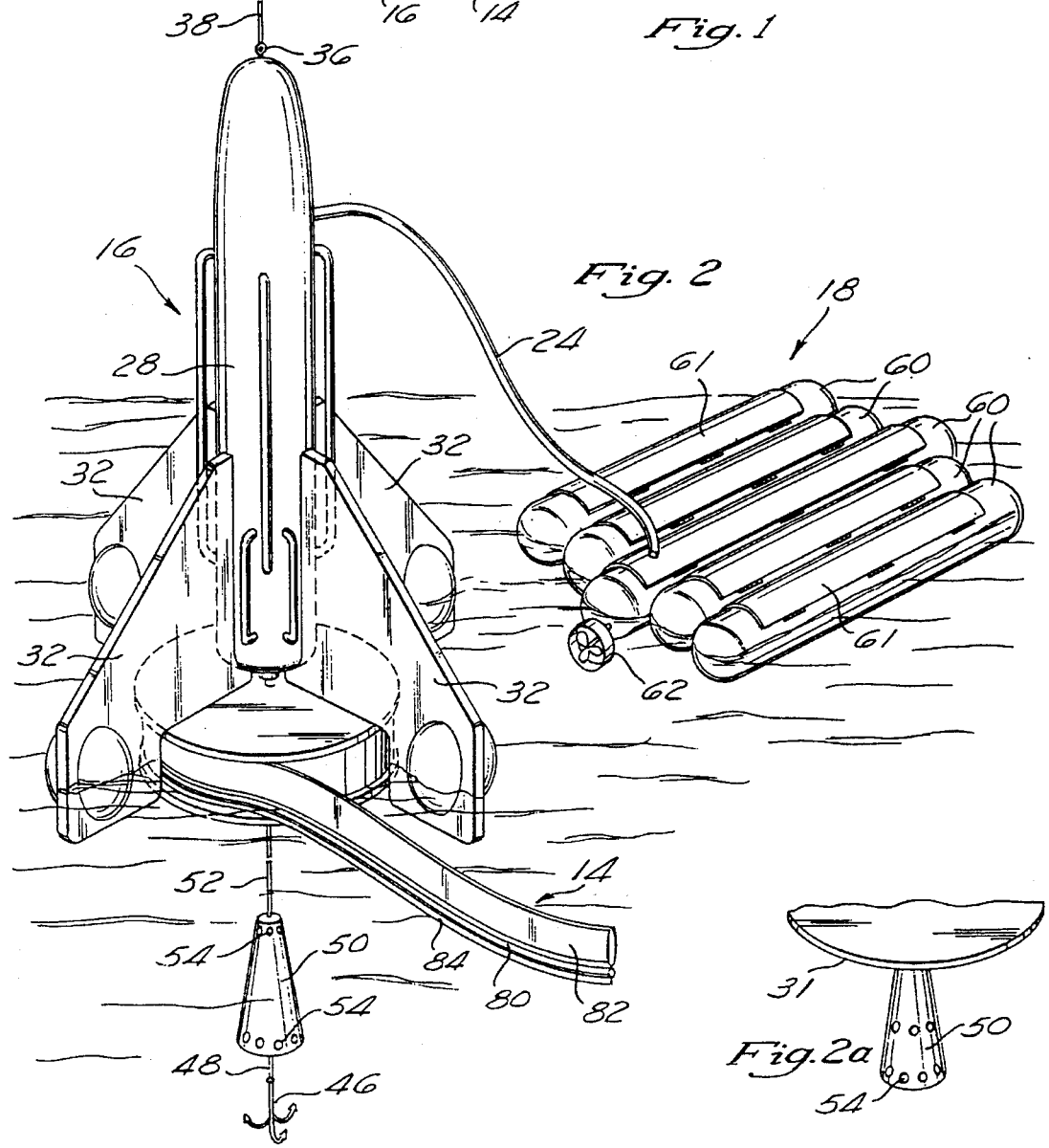
Fig. 2
Fig. 2a

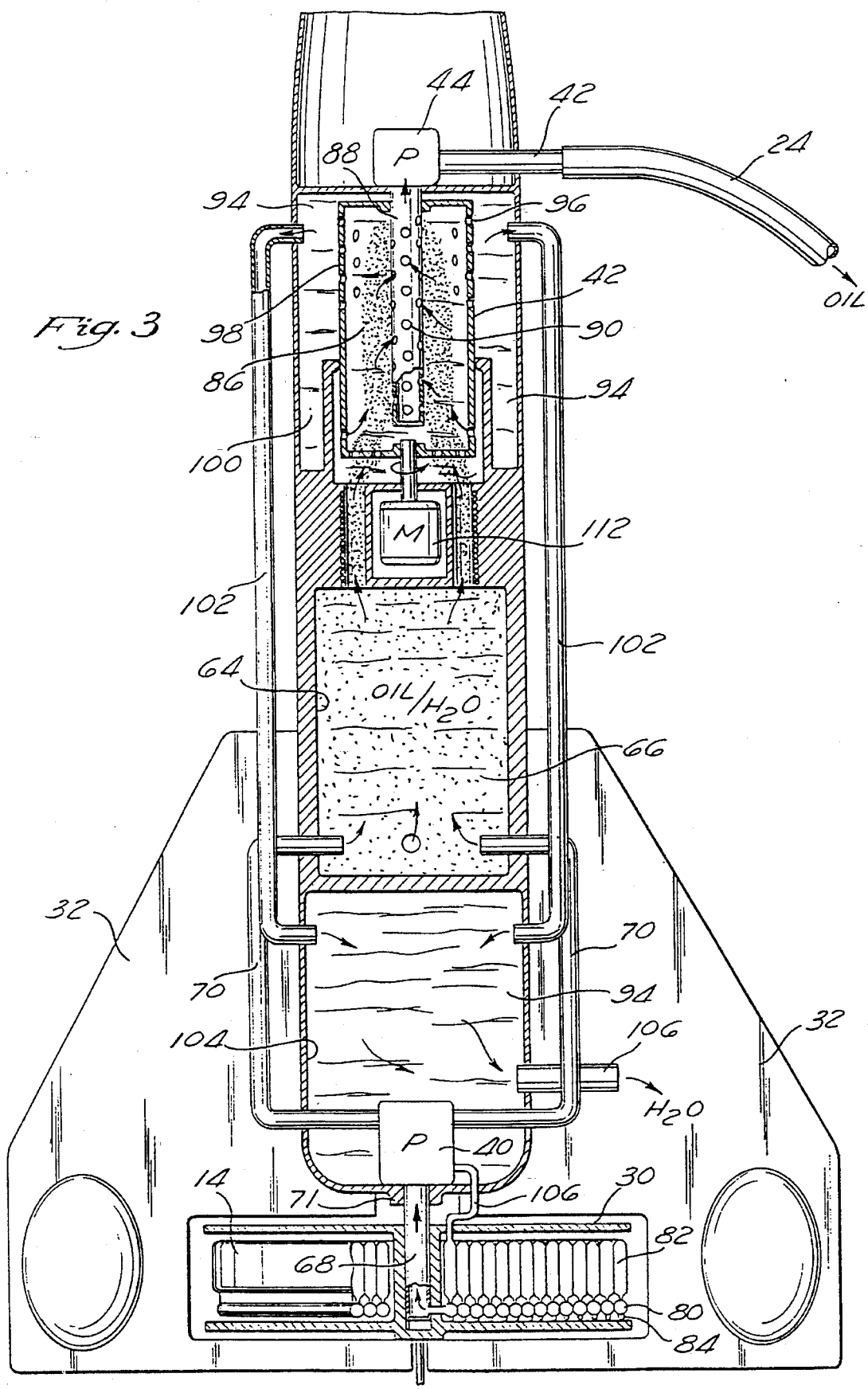

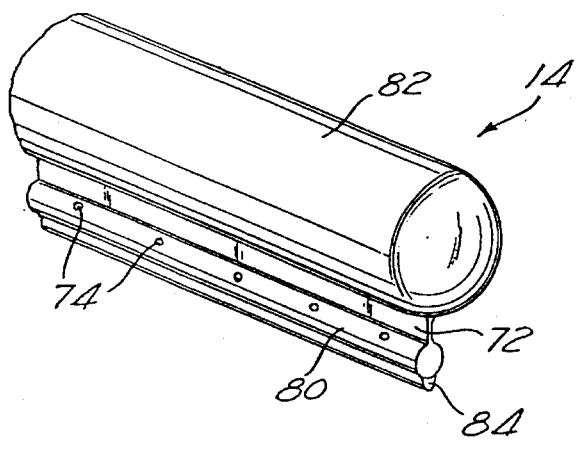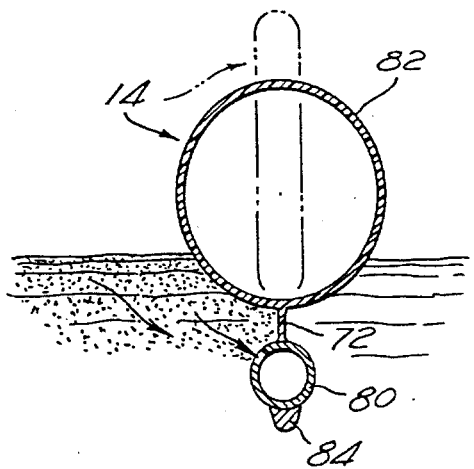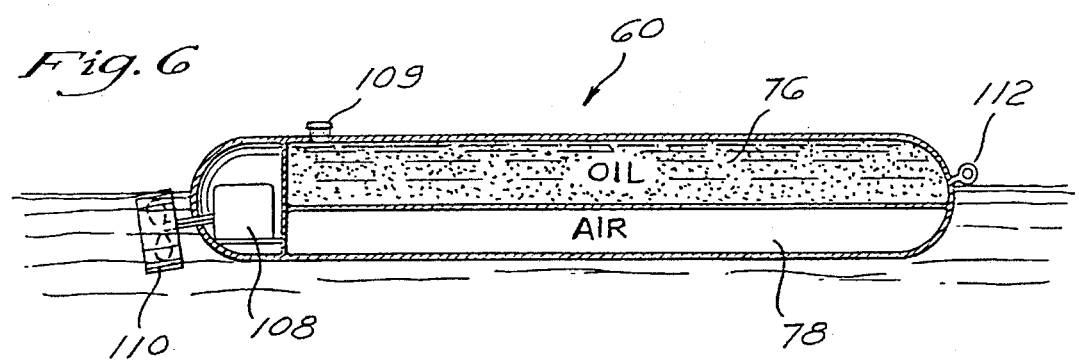

OIL SPILL CONTAINMENT AND RECOVERY SYSTEM

This application is a continuation, of application Ser. No. 07/919,778, filed Jul. 23, 1992, now U.S. Pat. No. 5,328,607.

FIELD OF THE INVENTION

The present invention relates generally to fluid handling and storage systems. It relates more particularly to an oil containment and recovery system for confining and collecting oil spills wherein the oil spill is surrounded and contained within a floating barrier and the oil is pumped from within the enclosure defined by the floating barrier into floating reservoirs proximate the barrier.

BACKGROUND OF THE INVENTION

Accidental oil spills frequently occur in navigable bodies of water. Such oil spills often kill a substantial quantity of both land and marine life as the water is polluted and beaches are covered with the resulting oil slick. The resulting environmental damage tends to be devastating in scope and long lasting in duration.

Oil spills typically occur as the result of either a rupture in an underwater pipeline or on an offshore oil rig or as a consequence of a catastrophic occurrence upon an oil transporting vessel. Ocean currents and winds may carry the oil spill for great distances, occasionally exceeding 1000 miles, where it is ultimately washed upon a beach.

Water vessels such as tankers and barges provide cost effective means for transporting industrial quantities of bulk chemicals such as oil for great distances, commonly across oceans. Such vessels commonly transport quantities of oil on the order of millions of gallons. Thus, the potential devastation caused by the inadvertent release of such chemicals from the transport vehicle is well recognized. Money damages can easily run into billions of dollars. The injury to wild life and the environment is potentially irreparable.

Such oil spills spread quickly, moved by the wind and ocean currents. They therefore must be contained rapidly, before reaching a size which makes containment impossible. Contemporary practice is to contain the oil slick by surrounding it with a floating barrier, commonly known as an oil boom. After the oil boom has contained the oil slick, various means may be utilized to disperse, destroy, or collect the oil. Various chemicals may be utilized to cause the oil to break up, dissolve, and/or sink to the bottom of the water. The use of such chemicals for making the oil miscible in water thus appears to alleviate the oil spill. However, the oil is merely spread throughout the water such that it may eventually cause even greater environmental damage. The oil may additionally be set on fire or treated with microbial agents to diminish its quantity. However, the preferable course of action is to collect the oil, thereby removing it from the sea.

Contemporary oil booms comprise little more than a plurality of partitions or fence like suctions which float upon the surface of the water and extend a short distance below the surface in an attempt to contain the oil spill within a defined area.

Unfortunately, contemporary oil spill containment and recovery systems are slow to deploy, comparatively ineffective at containing the oil spill, relatively labor intensive in their deployment and operation, and relatively inefficient and expensive to operate. Thus, contemporary oil containment and recovery systems suffer from substantial deficiencies which detract from their overall effectiveness and desirability. As such, it is desirable to provide a means for containing and storing oil spills which may be rapidly transported to the spill sight, quickly set up, and efficiently operated.

SUMMARY OF THE INVENTION

The present invention specifically addresses and alleviates the above mentioned deficiencies associated in the prior art. More particularly, the present invention comprises an oil containment and recovery system for confining and collecting oil spills wherein the oil spill is surrounded and contained within a floating barrier and the oil is then pumped from within the enclosure defined by the floating barrier into floating reservoirs proximate the barrier. The floating barrier utilizes an elongate inflatable buoyant member and an elongate suction conduit depending downwardly from the buoyant member and having a plurality of apertures formed therein through which oil flows into the suction member.

The inflatable member is inflated with air to obtain the desired buoyancy. A weight means depends downwardly from the suction conduit to maintain the buoyant member and suction conduit in a desired orientation to facilitate optimum containment and collecting of the oil spill. The buoyant member is collapsible into a substantially flat configuration such that the floating barrier and conduit can be wrapped about a reel in a compact manner which facilitates storage and transportation thereof. A pump in fluid communication with the suction conduit effects oil flow from the suction conduit to a centrifuge which separates water from the collected oil. The oil is then pumped to a floating reservoir proximate the floating barrier. The inflatable member is preferably inflated via an air pump disposed upon the pump and separator assembly.

The buoyant member and suction conduit are preferably formed as an integral unit, preferably by the extrusion of a flexible polymer material. The walls of the suction conduit are sufficiently rigid to prevent their collapse as fluid is drawn therethrough via a suction pump disposed upon the pump and separation assembly.

A pump in the pump and separation assembly effects fluid flow therefrom to the reservoir. The reservoir preferably comprises a plurality of inflatable tanks for storing the collected oil. The reservoir has a stowed configuration in which the tanks are collapsed and disposed side by side to generally define an elongate or torpedo-like structure. The reservoir also has an operative configuration in which the tanks are inflated or filled and disposed side by side to generally define a plurality of juxtaposed cylinders or torpedoes. Each tank preferably comprises an oil compartment extending approximately the length thereof for storing the collected oil and an air compartment likewise extending approximately the length thereof for increasing the buoyancy of the tank.

At least one of the inflatable tanks may optionally comprise a self contained propulsion means such as a battery, a motor, and a propeller which is driven by the motor. Remote control means preferably provide control of the propulsion means.

Although the description of the present invention is in connection with its use in the containment and recovery of oil, those skilled in the art will recognize that the system is likewise suitable for use in connection with various other petroleum products, e.g. gasoline, jet fuel, heating oil, as well as a wide variety of other liquids which have a specific gravity less than that of water such that they float thereupon.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of an oil carrying marine vessel leaking oil therefrom such that an oil spill is formed upon the surface of the water and additionally showing a barrier formed about the oil spill, oil separation and pumping means positioned along the barrier, and reservoirs attached to selected ones of the oil separation and pumping means according to the present invention;

FIG. 2 is an enlarged view of a pump and separator assembly and reservoir of FIG. 1;

FIG. 3 is an enlarged cross-sectional side view of the pump and separator assembly of FIG. 2;

FIG. 4 is a perspective view of an end portion of the barrier of FIGS. 1 and 2;

FIG. 5 is a cross-sectional side view of the barrier of FIG. 4 showing its collapsed configuration in phantom; and FIG. 6 is a cross-sectional side view of a reservoir tank as shown in FIGS. 1 and 2.

DETAILED DESCRIPTION OF THE PREFERRED EMBODIMENT

The detailed description set forth below in connection with the appended drawings is intended as a description of the presently preferred embodiment and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The oil spill containment and recovery system of the present invention is illustrated in FIGS. 1 through 6 which depict a presently preferred embodiment of the invention. Referring now to FIGS. 1 and 2, the oil spill containment and recovery system generally comprises a plurality of floating barriers 14 attached to a corresponding plurality of pump and separator assemblies 16 such that a containment is defined thereby. The containment generally encircles an oil spill 10. The source of the oil spill 10, in this instance an oil transporting marine vessel or tanker 12, is likewise positioned within the containment. A boat 20 deploys and positions the containment, typically by attaching one section of the floating barrier 14 thereto. Thus, the containment may be pulled by the boat 20 into position about the oil spill 10.

Individual pump and separator assemblies 16, preferably containing lengths of floating barrier 14, may be transported to the spill site via the boat 20, helicopter 22 and/or plane 23. A plurality of reservoirs 18 attach to selected pump and separator assemblies. The reservoirs 18 are attached to those pump and separator assemblies 16 having attached floating barriers 14 which are in intimate contact with the oil spill 10 such that oil may be collected thereby, separated from any water collected therewith, and disposed within the reservoirs 18.

Each pump and separator assembly 16 is comprised of a floats 26, preferably formed upon fins 32, to provide adequate flotational support and stability to the pump and separator assembly 16; a housing 28, containing a first pump 40 (FIG. 3) for drawing oil through the floating barrier 14 to the pump and separator assembly 16; an oil and water separator or centrifuge 42 (FIG. 3) for separating the oil from any water collected therewith; and a second pump 44 (FIG. 3) for pumping the collected oil from the pump and separator assembly 16 to an adjacent reservoir 18. A reel 30 is optionally disposed upon the pump and separator assembly 16 such that the floating barrier 14 may be wound thereupon for convenient storage and transport thereof. Fins 32 extend along a portion of the housing 28 and attach the housing 28 to the floats 26. An opening 34 formed in the floats 26 allows the floating barrier 14 to be dispensed from the reel 30 unobstructed.

The housing 28 preferably has an eyebolt, quick disconnect, or other such connection means 36 attached thereto such that a cable 38 may be further attached to the connection means 36 to facilitate transport of the pump and separator assembly 16 via a helicopter 22 or the like. An anchor 46 is preferably attached to the housing 28 via a cable 48.

Optionally, an underwater stabilization device 50 may be attached to the housing 28 to minimize roll and pitch motions due to waves, currents, or the wind. The attachment means 52 connecting the underwater stabilization device 50 to the housing 28 preferably comprises a rigid member, however, those skilled in the art will recognize that one or more flexible means, i.e., cable, rope, or chain, may likewise be utilized. The underwater stabilization device 50 comprises a substantially hollow cone, cylinder, or the like, having a plurality of openings 54 formed therein such that water may freely flow into the underwater stabilization device 50. Thus, once submerged, the underwater stabilization device becomes filled with water. Since the underwater stabilization device 50 is connected to the housing 28 such that roll or pitch motions of the housing 28 must cause a corresponding roll or pitch motion of the underwater stabilization device 50, inertia and viscous damping tend to minimize such motions.

The pump and separator assembly 16 is connected to at least one reservoir 18 via outlet conduit or hose 24 which receives the collected oil pumped out of the pump and separator assembly 16 via the second pump 44 (FIG. 3).

The reservoir 18 comprises a plurality of elongate tanks 60 attached together in a pontoon-like manner. At least one of the tanks 60 may optionally comprise a propulsion means 62 for providing mobility to the reservoir 18. The propulsion means is preferably remotely controlled such that the speed and direction of travel may be varied as desired. Doors 61 provide access to the interior of each of the tanks 60.

The reservoir 18 preferably has a stowed configuration in which the tanks 60 are collapsed and disposed side-by-side to generally define an elongate, torpedo like structure and an operative configuration in which the tanks 18 are filled or inflated and disposed side-by-side to generally define a plurality of juxtaposed cylinders. The propulsion means 62 is preferably operative when the tanks 60 are either the stowed or operative configurations. The floating barrier 14 comprises an inflatable buoyant member 82, a suction conduit 80 depending therefrom, and a weight means 84 depending from the suction conduit 80.

Referring now to FIG. 2a, the stabilization device 50 may alternatively attach rigidly and directly to the underside 31 of the pump and separator assembly 16. Such a rigid connection further enhances stabilization.

Referring now to FIG. 3, the pump and separator assembly 16 further comprises an oil and water chamber 64 in which oil and water 66 collected via the suction conduit 80 of the floating barrier 14 are stored. Oil 86 separated from the oil and water mixture 66 by the centrifuge 42 enters exit tube 88 through apertures 90 formed therein and is then pumped via the second pump 44 through outlet 92 and outlet hose 24 to the reservoir 18. Water 94 passes through apertures 96 in the rotating centrifuge member 98 to enter first water chamber 100 from which the water 94 travels downward through water tubes 102 to second water chamber 104 and back out to the ocean through water outlet 106.

In addition to pumping the oil and water mixture from the floating barrier 14 to the oil and water chamber 64, the first pump 40 additionally can be utilized to pump air into the inflatable buoyant member 82 of the floating barrier 14. Air is pumped from the first pump 40 to the inflatable buoyant member 82 via hose 106. Those skilled in the art will recognize that various other pumping and/or inflation means are likewise suitable for providing air or the like to the inflatable buoyant member 82.

The oil and water mixture 66 is pumped from the suction conduit 80 through the rotating inlet pipe 68 and into the oil and water tubes 70 via which the oil an water mixture 66 is piped to the oil and water chamber 64. The reel 30 is attached to the rotating inlet tube 68 such that the reel 30 and the rotating inlet tube 68 rotate together. Seal 71 facilitates substantially leak free interconnection of the rotating inlet tube 68 and the pump 40. Those skilled in the art will recognize that various such means are likewise suitable for interconnecting the rotating inlet 68 and the pump 40.

Referring now to FIGS. 4 and 5, the floating barrier 14 comprises an inflatable buoyant member 82, a suction conduit 80 depending from the inflatable buoyant member 82 via interconnecting member 72 and a weight means 84 depending from the suction conduit 80. Collection apertures 74 spaced at regular intervals along the suction conduit 80 provide fluid communication from the oil spill 10 through the suction conduit 80 to the first pump 40.

Referring now to FIG. 6, each tank 60 of the reservoir 18 comprises an oil compartment 76 and an air compartment 78. The oil compartment receives oil from the second pump 44 of the pump and separator assembly 16 via hose 24 which is connected to inlet port 109. Prior to filling the oil compartment 76 with oil, the air compartment 78 is inflated to ensure that the tank 60 has sufficient buoyancy. At least one tank 60 preferably contains a propulsion means, preferably comprising a motor 108 and propeller 110, the motor 108 is preferably an electric motor utilizing a battery (not shown) such that the propulsion means is self contained within the tank 60. Attachment means or eyelet 112 facilitates the convenient towing, anchoring, or securing of the tank 60.

Having thus described the structure of the oil containment and recovery system of the present invention, it may be beneficial to describe the operation thereof. Upon notification of an oil spill, pump and separator assembly 16 and reservoirs 18 are immediately transported via boats 20 and/or helicopters 22 to the spill sight. The oil spill 10 is immediately surrounded with floating barriers 14. This is accomplished by positioning a plurality of pump and separator assemblies proximate one another, extending the floating barriers 14 therefrom, inflating the inflatable buoyant members 82 of the floating barriers 14 and interconnecting the floating barriers 14 and pump and separator assemblies 16. Those skilled in the art will recognize that various interconnecting and/or attachment means are suitable for interconnecting the distal ends of the floating barriers with adjacent pump and separator assemblies.

Once interconnected, a barrier is formed which is positioned about and generally encircles the oil spill 10. A boat 20 is preferably utilized to position the pump and separator assembly 16 and floating barrier 14 such that the oil spill 10 is contained.

Once contained, the oil is pumped via the suction conduit 80 through the pump and separator assembly 16 and into the reservoirs 18. When full, the reservoirs 18 may be removed and replaced with empty reservoirs 18 to facilitate continued pumping.

During the pumping process the oil and water mixture is drawn into the first pump 40 and out through the oil and water tube 70 through which it enters the oil and water chamber 64. From the oil and water chamber 64, the oil travels to the centrifuge 42 which causes the heavier water to be forced outward through the water apertures 96 in the rotating centrifuge member 98 and then downward through the water tubes 102 into the second water chamber 104 and out through the water outlet 106. Motor 112 rotates the rotating centrifuge member 98 to effect the centrifugation process. The lighter oil flows through the oil apertures 90 in the exit tube 88 through pump 44 and outlet 92 into hose 24 through which the oil is carried to the reservoir 18. Self contained internal batteries (not shown) drive the first pump 40, second pump 44, and motor 112. Those skilled in the art will recognize that various other means for driving the first pump 40, second pump 44, and motor 112 are likewise suitable.

It is understood that the exemplary oil spill containment and recovery system described herein and shown in the drawings represents only a presently preferred embodiment of the invention. Indeed, various modifications and additions may be made to such embodiment without departing from the spirit and scope of the invention. For example, neither the pump and separator assembly nor the reservoirs need be configured as described and illustrated in the drawings. Rather, those skilled in the art will recognize that various configurations are likewise suitable. Furthermore, various processes other than centrifugation are likewise suitable for effecting separation of the oil and water. Thus, these and other modifications and additions may be obvious to those skilled in the art and may be implemented to adapt the present invention for use in a variety of different applications.

What is claimed is:

1. An oil containment and recovery system for confining and collecting oil spills, the oil containment and recovery system comprising:

(a) a buoyant barrier and conduit, said buoyant barrier and conduit comprising;
   i) an elongate inflatable buoyant member;
   ii) an elongate suction conduit connected to a means for producing suction depending downwardly from said buoyant member, said suction conduit having a plurality of apertures formed therein for receiving oil directly into said suction conduit; and
   iii) weight means formed upon said suction conduit to maintain said suction conduit in a position generally inferior to said buoyant member;

(b) a pump in fluid communication with said suction conduit for effecting oil flow therethrough; and (c) an elongate housing having buoyant fins extending therefrom, said pump being disposed within said housing, and said buoyant barrier and conduit being stowable proximate said housing.

2. The oil containment and recovery system as recited in claim 1 further comprising a centrifuge in fluid communication with said pump for separating the collected oil from water mixed therewith.

3. The oil containment and recovery system as recited in claim 2 further comprising:

(a) a reservoir comprising a plurality of inflatable tanks for storing the collected oil;

(b) said reservoir having a stowed configuration in which said tanks are collapsed and disposed side-by-side to generally define an elongate structure; and (c) said reservoir having an operative configuration in which said tanks are filled and disposed side-by-side to generally define a plurality of juxtaposed cylinders.

4. The oil containment and recovery system as recited in claim 3 wherein said reservoir tanks comprise:

(a) an oil compartment extending approximately the length of said tanks for storing the collected oil; and (b) an air compartment extending approximately the length of said tanks for providing buoyancy.

5. The oil containment and recovery system as recited in claim 3 wherein at least one of said plurality of inflatable tanks comprises a self-contained propulsion means.

6. The oil compartment and recovery system as recited in claim 5 wherein said propulsion means comprises:

(a) a motor; and (b) a propeller driven by said motor.

* * * * *